United States Patent
Praetorius et al.

(10) Patent No.: US 12,162,463 B2
(45) Date of Patent: Dec. 10, 2024

(54) METHOD FOR CONTROLLING AN ELECTRONIC SLIP-CONTROLLABLE BRAKING SYSTEM FOR A MOTOR VEHICLE

(71) Applicant: Robert Bosch GmbH, Stuttgart (DE)

(72) Inventors: Christian Michael Praetorius, Obersulm (DE); Daniel Frank, Kleinsachsenheim (DE); Jens Wagner, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 612 days.

(21) Appl. No.: 17/276,707

(22) PCT Filed: Oct. 1, 2019

(86) PCT No.: PCT/EP2019/076559
§ 371 (c)(1),
(2) Date: Mar. 16, 2021

(87) PCT Pub. No.: WO2020/114646
PCT Pub. Date: Jun. 11, 2020

(65) Prior Publication Data
US 2022/0024430 A1  Jan. 27, 2022

(30) Foreign Application Priority Data
Dec. 6, 2018 (DE) .......................... 102018221077.2

(51) Int. Cl.
*B60T 13/66* (2006.01)
*B60T 7/04* (2006.01)
(Continued)

(52) U.S. Cl.
CPC ............ *B60T 8/4081* (2013.01); *B60T 7/042* (2013.01); *B60T 8/171* (2013.01); *B60T 8/4077* (2013.01);
(Continued)

(58) Field of Classification Search
CPC ........ B60T 7/042; B60T 8/171; B60T 8/4081; B60T 13/146; B60T 13/662;
(Continued)

(56) References Cited

U.S. PATENT DOCUMENTS 5,853,229 A     12/1998  Willmann et al.
10,315,640 B2 *  6/2019  Irwan .................... B60T 17/221
(Continued)

FOREIGN PATENT DOCUMENTS

CN       1946600 A     4/2007
CN       107618492 A   1/2018
(Continued)

OTHER PUBLICATIONS

International Search Report for PCT/EP2019/076559, Issued Jan. 24, 2020.

*Primary Examiner* — Nicholas J Lane
(74) *Attorney, Agent, or Firm* — NORTON ROSE FULBRIGHT US LLP; Gerard A. Messina

(57) ABSTRACT

A braking system includes an actuating unit for specifying a braking intention, and multiple braking devices. A first braking device includes a wheel brake, onto which a drivable pressure generator is able to apply a pressure medium, which is under braking pressure, the pressure generator being contactable with a pressure medium reservoir via a supply line. A second braking device, for converting kinetic energy of the motor vehicle into electric energy, is equipped with a drivable electric machine. The two braking devices jointly contribute to the generation of the braking power of (Continued)

the braking system, the respective proportion of a braking device in the braking power being variable. A connection is established, through which pressure medium is able to flow, from the wheel brake to the pressure medium reservoir using an electronic control unit, when the second braking device is able to itself generate the braking power.

6 Claims, 2 Drawing Sheets

(51) Int. Cl.
- *B60T 8/171* (2006.01)
- *B60T 8/40* (2006.01)
- *B60T 13/14* (2006.01)
- *B60T 13/68* (2006.01)
- *B60T 13/74* (2006.01)

(52) U.S. Cl.
CPC .......... *B60T 13/146* (2013.01); *B60T 13/662* (2013.01); *B60T 13/686* (2013.01); *B60T 13/745* (2013.01); *B60T 2270/604* (2013.01)

(58) Field of Classification Search
CPC .... B60T 13/686; B60T 13/745; B60T 13/148; B60T 2270/604; B60T 2270/608
See application file for complete search history.

(56) References Cited

U.S. PATENT DOCUMENTS

| | | | |
|---|---|---|---|
| 2013/0043718 A1* | 2/2013 | Feigel | B60T 8/4845 303/14 |
| 2013/0214587 A1* | 8/2013 | Yang | B60T 8/4081 303/6.01 |
| 2013/0270895 A1* | 10/2013 | Nishioka | B60T 13/161 303/14 |
| 2016/0152223 A1* | 6/2016 | Bauer | B60T 7/042 303/14 |
| 2016/0272175 A1* | 9/2016 | Ellwein | B60T 8/885 |
| 2017/0282881 A1* | 10/2017 | Nakamura | F04B 17/03 |
| 2018/0079313 A1* | 3/2018 | Foitzik | B60T 13/741 |
| 2018/0118179 A1* | 5/2018 | Ko | B60T 13/142 |
| 2020/0307538 A1* | 10/2020 | Ganzel | B60T 8/4081 |

FOREIGN PATENT DOCUMENTS

| | | |
|---|---|---|
| DE | 19604134 A1 | 8/1997 |
| DE | 102011004983 A1 | 9/2012 |
| DE | 102012222974 A1 | 6/2014 |
| DE | 102013224313 A1 | 9/2014 |
| DE | 102013208674 A1 | 11/2014 |
| DE | 102013014188 A1 | 2/2015 |
| DE | 102014222759 A1 | 5/2016 |
| KR | 20180102589 A | 9/2018 |
| WO | 2012152352 A1 | 11/2012 |

* cited by examiner

METHOD FOR CONTROLLING AN ELECTRONIC SLIP-CONTROLLABLE BRAKING SYSTEM FOR A MOTOR VEHICLE

FIELD

The present invention relates to a method for controlling an electronic slip-controllable braking system for a motor vehicle.

BACKGROUND INFORMATION

Conventional electronic slip-controllable braking systems of motor vehicles include an actuating unit by which a braking intention is predefinable by the driver of the motor vehicle. This braking intention is detected with the aid of sensor units and supplied to an electronic control unit, which ascertains a braking power to be applied by the braking system from these input signals. This braking power is then applied jointly by multiple braking devices, which are activated or actuated separately from one another by the electronic control unit. A first braking device is equipped with a drivable pressure generator, which delivers pressure media to a wheel brake, building up a braking pressure, while a second braking device includes a drivable electric machine, which is able to convert kinetic energy of the motor vehicle into electrical energy. In the case of motor vehicles equipped with an electric motor as the power unit, the electric motor may be switched over from a drive mode into a generator mode for this purpose.

The two braking devices jointly contribute to the generation of the braking power, the proportions of the individual braking devices in the entire braking power being settable independently of one another by the electronic control unit. A preferably large number of braking processes are sought to be carried out purely in generator mode since this increases the energetic efficiency of electrically driven vehicles, and at the same time minimizes unavoidable wear at the pressure medium-controlled first braking device.

Carrying out braking processes in a pressure-controlled manner may be disadvantageous when the braking pressure, once generated, cannot be completely reduced when a need changes. A remaining residual braking pressure in affected wheel brakes causes a residual grinding torque, and counteracts a minimization of the energy consumption of an electrically driven motor vehicle.

The cause of the development of residual braking pressure in wheel brakes may be, for example, thermal effects occurring during a brake application, relaxation effects at the components to which pressure is applied, or an increased air gap of the wheel brakes.

A complete pressure equalization within the first braking device is additionally made more difficult when the corresponding braking device is designed as a closed system, and thus does not include an interface to the atmosphere. Even though potential residual braking pressure may be reduced in a sensor-controlled manner in a closed system with the aid of an actuation of the pressure generator, a complete pressure equalization cannot be ensured in all circumstances, due to existing sensor tolerances or due to an exhaustion of the delivery volume of the pressure generator, which may occur, in particular, when a plunger unit is used as the pressure generator.

SUMMARY

Example embodiments of the present invention may have the advantage over the related art that remaining residual grinding torques in wheel brakes are automatically reducible by the braking system, without the driver noticing this, and without the existing functional scope of the braking system being disadvantageously affected thereby. A motor vehicle equipped with the present invention may therefore be operated with a particularly good electrical efficiency. The present invention is implementable from a control point of view and may be carried out using the components and line connections present in a pressure medium-controlled braking device anyway. In this way, no additional part, machining or assembly complexity arises during the manufacture of such a braking device.

Further advantages or advantageous refinements of the present invention disclosed herein.

The method in accordance with the present invention is, in particular, usable with electronic slip-controllable braking systems of motor vehicles which include a pressure medium-controlled braking device, whose pressure generator is suitable for being able to build up as well as reduce a braking pressure. Such pressure generators are capable of blending braking torques generated regeneratively with pressure medium-controlled braking torques, without potential changes of the respective proportions in the braking power of the braking system being noticeable by the driver or the occupants of the motor vehicle. In particular, plunger units are suitable in this regard, in which a plunger piston is accommodated relatively displaceably in a plunger cylinder, and in which the plunger piston and the plunger cylinder are drivable to carry out a translational relative movement for a change in the braking pressure, controlled by a motor.

BRIEF DESCRIPTION OF THE DRAWINGS

One exemplary embodiment of the present invention is described in detail based on the figures.

DETAILED DESCRIPTION OF EXAMPLE EMBODIMENTS

Figure 1:
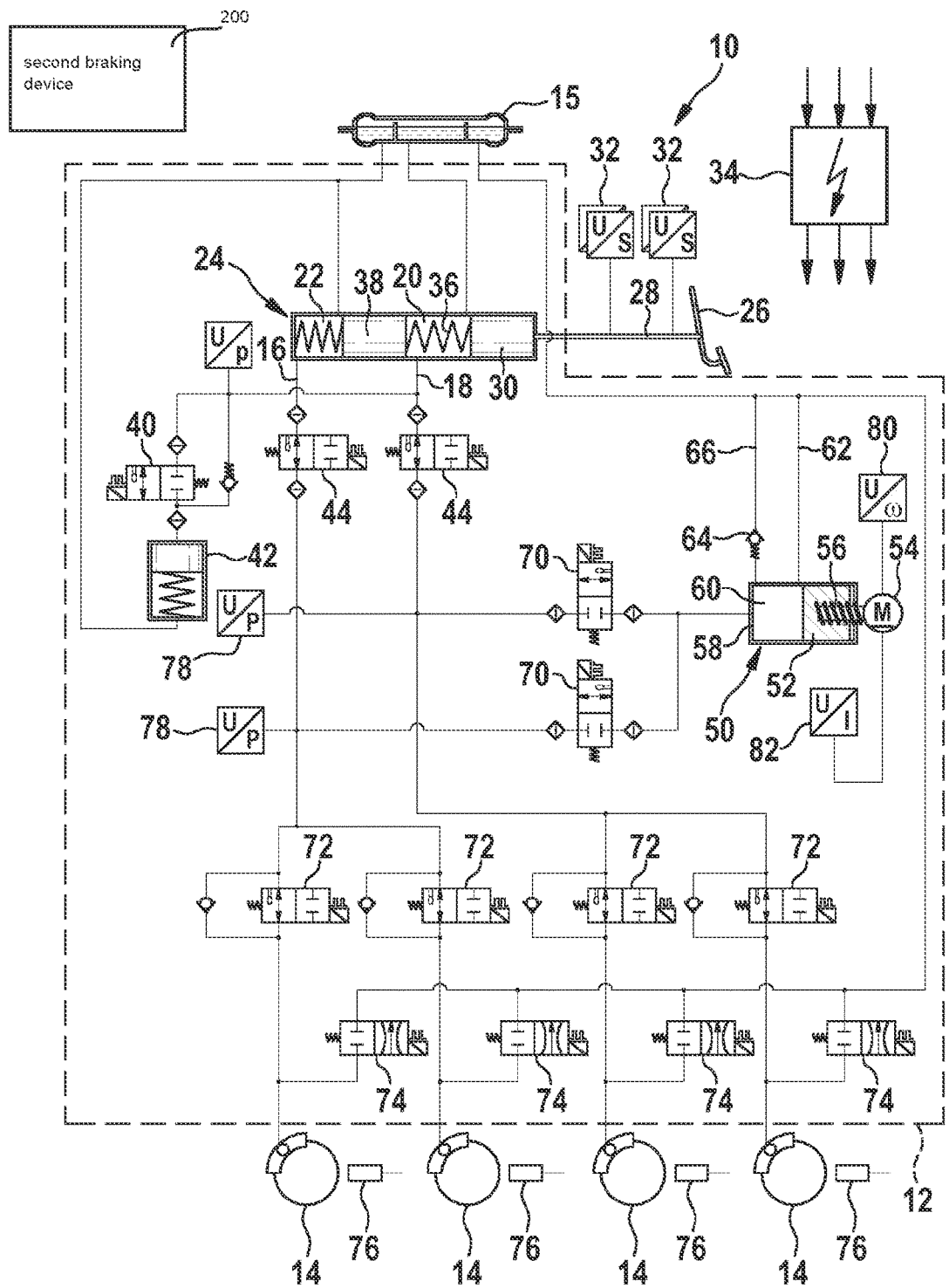
FIG. 1, by way of example, shows a hydraulic circuit diagram of an electronic slip-controllable vehicle braking system underlying the present invention.

As mentioned above, FIG. 1 by way of example shows a hydraulic circuit diagram of a first braking device 10 of an electronic slip-controllable braking system underlying the present invention.

The device is described, for example, in German Patent Application No. DE 10 2014 222 759 A1.

The illustrated braking device 10 is broken down into a hydraulic power unit 12, wheel brakes 14 connected thereto, and an also connected pressure medium reservoir 15. In total, four wheel brakes 14 are present, which are each supplied in pairs with pressure medium via two present brake circuits 16 and 18.

One of the two brake circuits 16, 18 of braking device 10 is connected in each case to one of a total of two pressure medium chambers 20, 22 of a master brake cylinder 24, which in the exemplary embodiment, by way of example, is also accommodated in hydraulic power unit 12. Each of pressure medium chambers 20, 22 is, in turn, connected to pressure medium reservoir 15. Master brake cylinder 24 is actuatable with the aid of an actuating unit 26, for example implemented in the form of a pedal, by the driver by muscular power. The pedal is connected for this purpose via a coupling rod 28 to a so-called rod piston 30 of master brake cylinder 24. The driver predefines a braking intention via an actuation of the pedal. This braking intention manifests itself in an actuating path of the coupling rod 28, which is detected by a first sensor unit 32 and supplied to an electronic control unit 34 of braking device 10. Rod piston 30 of master brake cylinder 24 follows the movement of coupling rod 28. A rod piston spring 36, with the aid of which rod piston 30 is supported on a floating piston 38 of master brake cylinder 24, transfers the displacement of rod piston 30 onto floating piston 38.

Pressure chamber 20 of master brake cylinder 24 assigned to rod piston 30 is coupled via a pressure medium connection controllable by a simulator control valve 40 to a simulator unit 42, in which the pressure medium displaced from pressure chamber 20 of master brake cylinder 24 is buffered in the case of an actuation of the pedal.

Pressure chambers 20 and 22 of master brake cylinder 24 assigned to rod piston 30 and floating piston 38 are each controllably connected to one of brake circuits 16, 18. For controlling the two pressure medium connections, electronically activatable separating valves 44 are situated at hydraulic power unit 12. During normal operation of the braking system, separating valves 44 are closed, and master brake cylinder 24 is thus decoupled from brake circuits 16, 18.

A braking pressure proportional to a predefined braking intention is provided in brake circuits 16, 18 by a pressure generator 50, which is contacted in parallel to master brake cylinder 24 with brake circuits 16, 18. In the illustrated case, a plunger unit serves as pressure generator 50, in which a plunger piston 52 is driven by an activatable motor 54, via a downstream gearbox 56, to carry out a linear movement relative to a plunger cylinder 58. This pressure generator 50 displaces a pressure medium from a plunger working chamber 60, enclosed between plunger cylinder 58 and plunger piston 52, into brake circuits 16, 18, and in this way causes a change in braking pressure.

This plunger working chamber 60 is connected to pressure medium reservoir 15 directly via a directly implemented, first supply line 62, and indirectly via a second supply line 66 controlled by a check valve 64. Check valve 64 allows a flow-through in the direction from pressure medium reservoir 15 to plunger working chamber 60, and blocks the opposite flow direction. Furthermore, second supply line 66 provided with check valve 64 opens into plunger working chamber 60 in the immediate surroundings of the closed end of plunger cylinder 58, while an opening point of first supply line 62 opens with axial distance thereto at an end facing motor 54, at the circumference of plunger cylinder 58. The coupling of plunger working chamber 60 to pressure medium reservoir 15 is controllable by an actuation of the plunger unit, or takes place as a function of a relative position of plunger piston 52 in plunger cylinder 58. Plunger piston 52 thus unblocks the connection as soon as it has been brought by motor 54 at least into the vicinity of an initial position, this initial position being characterized in that plunger working chamber 60 there, at least approximately, has its maximum volume. Plunger piston 52 interrupts the connection as soon as it has covered an establishable actuating path out of this initial position in the direction of an outer reversal position, in which plunger working chamber 60 assumes its minimum volume.

The braking system is furthermore equipped with electronically activatable plunger control valves 70, which control connections between brake circuits 16, 18 and pressure generator 50.

In each case downstream of plunger control valves 70 and separating valves 44, braking device 10 also includes a so-called pressure modulation unit. This is made up in each case of an assigned electronically activatable pressure build-up valve 72 and pressure reduction valve 74, per wheel brake 14. By a corresponding electronic activation, pressure build-up valves 72 and pressure reduction valves 74 enable an adaptation of the wheel braking pressure prevailing in the individual wheel brakes 14 to the slip conditions at the respective assigned wheel. Potentially occurring slip at one of the wheels is detected by an assigned wheel speed sensor 76 based on a decreasing wheel speed, and is minimized by a reduction of the braking pressure.

For this purpose, the respective pressure build-up valve 72 is closed, and the pressure reduction valve 74 is opened, the valve actuation being carried out by electronic control unit 34. For the wheel-specific regulation of the braking pressure, braking device 10 is equipped with different sensor units. As mentioned, a first sensor unit 32 detects an actuation of actuating unit 26 by the driver, second sensor units 78 detect the braking pressure in the respective assigned brake circuits 16, 18, and a third, not apparent, sensor unit is provided to detect a deceleration or an acceleration of the vehicle. Further sensor units 80, 82, as described above, evaluate a rotation behavior of the wheels as well as a rotation angle of a drive shaft of motor 54 of pressure generator 50. All signals of sensor units 32, 78 through 82 are fed to electronic control unit 34, which ascertains activation signals therefrom to motor 54 of pressure generator 50 and to the described valves 40, 44, 70 through 74.

As described at the outset, a second, not shown braking device is provided in addition to the above-described first braking device 10. The second braking device 200 includes a drivable electric machine, which converts kinetic energy of the vehicle into electrical energy. The two braking devices jointly generate the braking power of the braking system, the proportions of the respective braking devices in this braking power being almost arbitrarily settable between 0% and 100%. The setting of the proportions during a brake application is carried out by electronic control unit 34, which activates or actuates the braking devices independently of one another for this purpose.

In the case of first braking device 10 actuated by pressure medium, however, residual braking pressures may arise in wheel brakes 14 under the aforementioned circumstances, which cause undesirable, efficiency-lowering grinding torques. One reason for this is that, due to a preceding braking pressure build-up by the plunger unit, plunger piston 52 and plunger cylinder 58 assume a relative position to one another, in which a pressure medium-conducting connection between wheel brakes 14 and pressure medium reservoir 15 is interrupted, so that no pressure reduction to atmosphere may take place.

To reduce undesirable grinding torques, the present invention therefore provides establishing or opening a pressure medium connection from wheel brake 14, via pressure generator 50, to pressure medium reservoir 15 when the desired braking power of the braking system may be provided solely by the second braking device 200. This state is also establishable by electronic control unit 34 by comparing the braking power ascertainable from the braking intention of the driver to the maximum power proportion suppliable by the second braking device 200. As soon as the proportion of the second braking device 200 is sufficient for providing the desired braking power, pressure generator 50 or the plunger unit of first braking device 10 is activated by electronic control unit 34 in such a way that plunger piston 52 and plunger cylinder 58 assume a relative position to one another, in which supply line 62 of plunger unit is connected in a pressure medium-conducting manner to plunger working chamber 60. Wheel brakes 14 contacted with plunger working chamber 60 are thus also connected to this pressure medium reservoir 15 via this plunger working chamber 60 and supply line 62. A potentially prevailing braking pressure in wheel brakes 14 may now be discharged into pressure medium reservoir 15 and reduced to atmospheric pressure. The set relative position at least approximately corresponds to the initial or basic position of the plunger unit, i.e., the position in which plunger working chamber 60 at least approximately has its maximum volume.

The pressure medium connection of wheel brake 14 to plunger working chamber 60 is, as mentioned in the description of FIG. 1, controllable by electronically actuatable plunger control valves 70. In parallel to or simultaneously with the activation of the plunger unit, these plunger control valves 70 are thus switched by electronic control unit 34 into their passage position, to provide a connection, through which pressure medium is able to flow, from wheel brakes 14 to pressure medium reservoir 15. This pressure medium connection may be kept open until a new braking intention has been transmitted to electronic control unit 34, during which an involvement of first braking device 10 is necessary for generating the desired braking power.

If this prerequisite applies, electronic control unit 34 cancels the activation of plunger control valves 70 so that these return to their blocking position, and interrupt the previously existing connection of brake circuits 16, 18 or of the wheel brakes to pressure medium reservoir 15. The plunger unit is then at least approximately available with the entire volume of its plunger working station 60 for the build-up of a new braking pressure.

It shall be explicitly pointed out that on the condition that the second braking device 200 by itself is able to generate a braking power corresponding to the braking intention, a braking pressure reduction may be carried out in wheel brakes 14 to atmospheric pressure by the described method while an actuation of actuating unit 26 takes place by the driver for specifying this braking intention. In other words, a pressure equalization takes place in the first braking device during an ongoing brake application.

Figure 2:
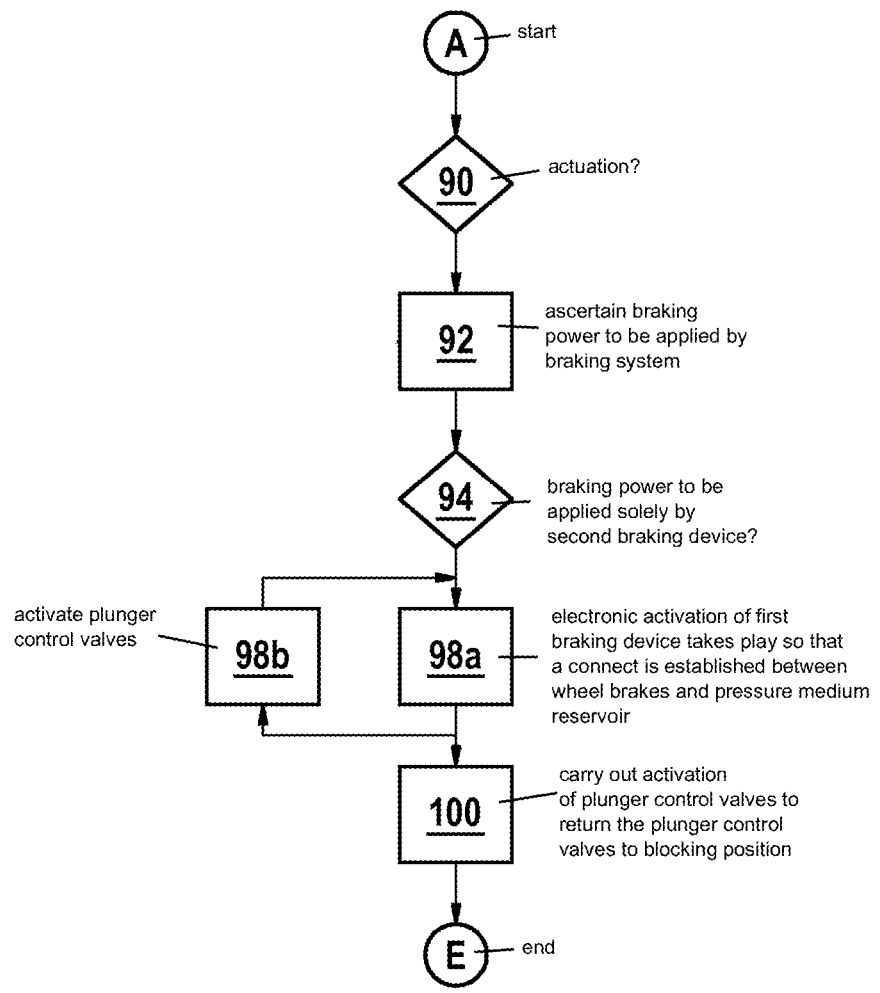
FIG. 2 illustrates an example embodiment of the present invention based on a flowchart.

FIG. 2 shows the described method again as a flowchart. In a first step 90, a query takes place after an actuation of actuating unit 26. If such an actuation is established, the braking power to be applied by the braking system may be ascertained in a subsequent step 92 based on the signals of sensor units 78 detecting the braking pressure. With step 94, it is subsequently established whether the braking power to be applied may be provided solely by the second braking device 200. If so, an electronic activation of first braking device 10 takes place with step 98a in such a way that a connection, which extends through the plunger unit and supply line 62 of the plunger unit and through which pressure medium is able to flow, is established between wheel brakes 14 and pressure medium reservoir 15.

To provide this connection through which pressure medium is able to flow, the plunger unit is activated in the direction of its initial position. An activation of plunger control valves 70 into the passage position takes place simultaneously therewith in step 98b. The connection, through which pressure medium is able to flow, between wheel brake 14 and pressure medium reservoir 15 thus created may be kept open until a renewed braking intention is present, during which a proportion to be provided by first braking device 10 is requested for the generation of the desired braking power. Until the pressure medium connection is closed, the braking pressure of first braking device 10 may be reduced to the atmospheric pressure of pressure medium reservoir 15, and a residual grinding torque in wheel brake 14 is avoided. The method ends subsequent to step 100, in which the activation of plunger control valves 70 is carried out in such a way that these plunger control valves 70 return to their blocking position and interrupt the connection of wheel brake 14 to pressure medium reservoir 15 for a necessary subsequent braking pressure build-up by first braking device 10.

Changes or supplements compared to the described exemplary embodiment are, of course, possible, without departing from the scope of the present invention.

What is claimed is:

1. A method for controlling an electronic slip-controllable braking system for a motor vehicle, the braking system being equipped with an actuating unit for specifying a braking intention by a driver of the motor vehicle, and includes multiple braking devices controllable independently of one another by an electronic control unit, a first braking device of the braking devices includes a wheel brake for a wheel of the motor vehicle, onto which a drivable pressure generator is able to apply a pressure medium, which is under braking pressure, and which is equipped with a supply line, via which the pressure generator is contactable with a pressure medium reservoir, and a second braking device of the braking devices is configured to convert kinetic energy of the motor vehicle into electric energy and is equipped with a drivable electric machine, the braking devices jointly generating a braking power of the braking system, and respective proportions of the braking devices in a braking power of the braking system being variably settable by the electronic control unit, the method comprising:

detecting actuation of the actuating unit;
ascertaining braking power to be applied based on the actuation;
determining whether the second braking device is able to itself generate the braking power to be applied without use of the first braking device; and
based on determining that the second braking device is able to itself generate the braking power to be applied without use of the first braking device: (i) activating, by the electronic control unit, the pressure generator, simultaneously with activating, by the electronic control unit, a plunger control valve of the first braking device to switch the plunger control valve from a closed position to an open position, the activating of the pressure generator and the activating of the plunger control valve opening a pressure medium connection through which pressure medium is able to flow from the wheel brake to the pressure medium reservoir, and (ii) discharging prevailing braking pressure in the wheel brake through the open pressure medium connection into the pressure medium reservoir, the pressure medium connection including: (i) the supply line which is opened by the activating of the pressure generator, and (ii) a connection between a brake circuit of the first braking device and the pressure generator which is opened by the activating of the plunger control valve to the open position;
wherein the plunger control valve of the first braking device controls the connection between the brake circuit of the first braking device and the pressure generator, and wherein the first braking device further includes a separating valve configured to decouple a master brake cylinder from the brake circuit, and wherein the first braking device further includes a pressure modulation unit downstream of the plunger control valve and the separating valve, the pressure modulation unit including an electronically activatable pressure build-up valve and an electronically activatable pressure reduction valve, the pressure module unit being configured to adapt wheel braking pressure prevailing in the wheel brake to slip conditions at the wheel.

2. The method as recited in claim 1, wherein, for the opening of the pressure medium connection through which pressure medium is able to flow from the wheel brake to the pressure medium reservoir, the pressure generator is activated in a direction of an initial position, in which a working chamber of the pressure generator at least approximately has its maximum volume, and the pressure medium connection through which flow pressure medium is able to flow from the wheel brake to the pressure medium reservoir leads through the connection between a brake circuit of the first braking device and the pressure generator controlled by the plunger control valve, and through the working chamber of the pressure generator to the supply line.

3. The method as recited in claim 1, wherein the pressure generator includes a plunger unit made up of a plunger piston, a plunger cylinder, and a plunger working chamber enclosed between the plunger cylinder and the plunger piston, the plunger piston and the plunger cylinder being drivable to carry out linear relative movements in two opposite spatial directions, a volume of a plunger working chamber decreasing to a minimum value when the relative movement occurs in a first movement direction, and the volume of the plunger working chamber increasing to a maximum value when the relative movement occurs in a second movement direction opposite the first movement direction, and the plunger unit is driven in the second movement direction, for a contacting of the plunger working chamber with the supply line, until the plunger piston and the plunger cylinder at least approximately assume an initial position with respect to one another.

4. The method as recited in claim 1, wherein the pressure medium connection through which pressure medium is able to flow from the wheel brake to the pressure medium reservoir is closed when a braking intention is present in which the braking power of the braking system can no longer be generated solely by the second braking device without use of the first braking device.

5. The method as recited in claim 1, wherein the first braking device further includes a second supply line, controlled by a check valve, via which the pressure generator is hydraulically contactable with the pressure medium reservoir.

6. The method as recited in claim 5, wherein the pressure generator includes a plunger unit made up of a plunger piston, a plunger cylinder, and a plunger working chamber enclosed between the plunger cylinder and the plunger piston, wherein the plunger working chamber is connected to the pressure medium reservoir directly via the first supply line, and indirectly via the second supply line controlled by the check valve, wherein the check valve allows a flow-through of pressure medium in a direction from the pressure medium reservoir to the plunger working chamber.

* * * * *